(12) United States Patent
Miller et al.

(10) Patent No.: US 6,540,616 B2
(45) Date of Patent: Apr. 1, 2003

(54) VENTING DEVICE FOR A CONSTANT VELOCITY JOINT

(75) Inventors: Michael J. Miller, White Lake Township, MI (US); John A. Ramey, St. Clair Shores, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/833,842

(22) Filed: Apr. 12, 2001

(65) Prior Publication Data

US 2002/0151369 A1 Oct. 17, 2002

(51) Int. Cl.[7] ............................................. F16D 3/223
(52) U.S. Cl. ........................................ 464/17; 137/849
(58) Field of Search ......................... 464/15, 17, 145; 277/928; 251/335.1, 358; 137/855, 849, 859; 222/490

(56) References Cited

U.S. PATENT DOCUMENTS

| | | | | | |
|---|---|---|---|---|---|
| 584,091 | A | * | 6/1897 | Leidich | ...................... 137/849 |
| 591,067 | A | * | 10/1897 | Wallace | ................... 222/490 X |
| 2,772,829 | A | * | 12/1956 | Crawford et al. | ....... 137/849 X |
| 2,818,089 | A | * | 12/1957 | Mayhill | ................... 137/849 X |
| 3,342,208 | A | * | 9/1967 | Steffes | ..................... 222/490 X |
| 3,470,711 | A | * | 10/1969 | Kayser | ................... 137/849 X |
| 4,492,253 | A | * | 1/1985 | Raftis | .......................... 137/849 |
| 6,220,967 | B1 | * | 4/2001 | Miller | ......................... 464/145 |
| 6,322,452 | B1 | * | 11/2001 | Kondo | .......................... 464/17 |
| 2002/0025854 | A1 | * | 2/2002 | Miller et al. | .................. 464/15 |
| 2002/0132669 | A1 | * | 9/2002 | Chrobak et al. | .............. 464/17 |

OTHER PUBLICATIONS

Vernay, "Duckbills", Vernay Laboratories, Yellow Springs, OH, Nov. 1984.*

* cited by examiner

Primary Examiner—Greg Binda

(57) ABSTRACT

A constant velocity joint vent for use in a constant velocity joint of an automotive vehicle. The constant velocity joint vent including a circumferential base and a cylindrical projection extending from one end of the base. The constant velocity joint vent further including a circumferential flange extending from the surface of the projection and a valve arranged on an end of the cylindrical projection opposite that of the base.

9 Claims, 4 Drawing Sheets

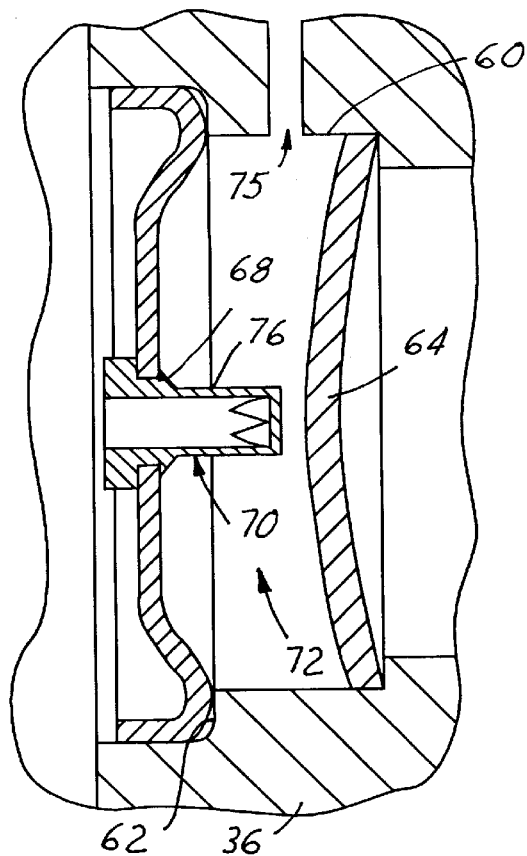
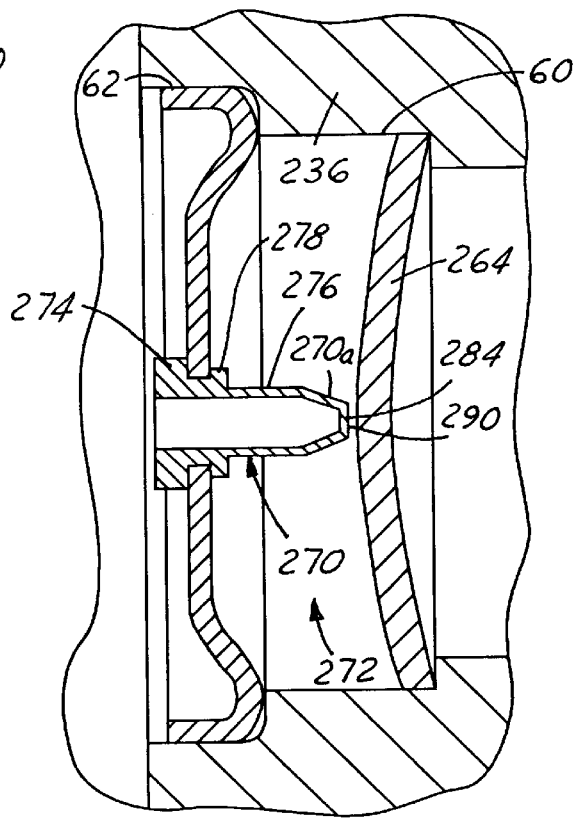
FIG. 4  FIG. 5
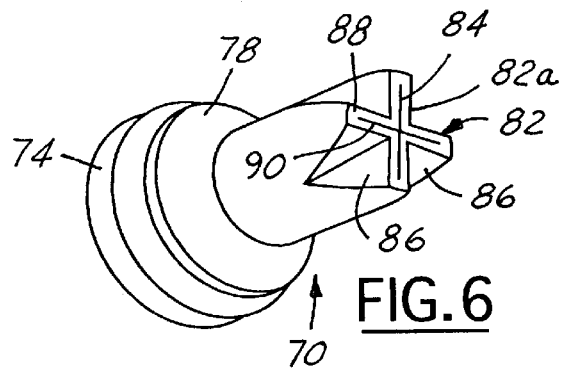
FIG. 6
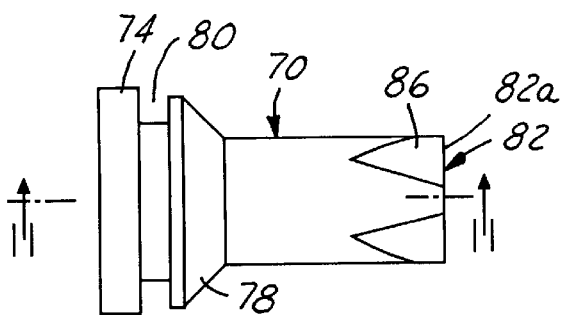
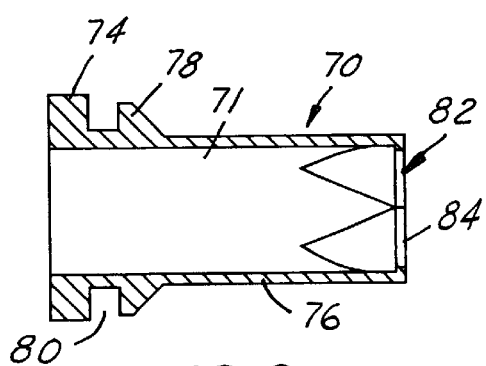
FIG. 7  FIG. 8

VENTING DEVICE FOR A CONSTANT VELOCITY JOINT

TECHNICAL FIELD

The present invention generally relates to constant velocity joints, and more particularly, to a vent for a constant velocity joint.

BACKGROUND ART

Constant velocity joints (CV joints) are common components in automotive vehicles. Typically constant velocity joints are employed where transmission of a constant velocity rotary motion is desired or required. The common types of constant velocity joints are a plunging tripod, a fixed tripod, a plunging ball joint and a fixed ball joint. These common types of constant velocity joints are either usually in a mono block style or disc style. Furthermore, these types of constant velocity joints currently are used in front wheel drive vehicles or rear wheel drive vehicles and on the propeller shafts found in rear wheel drive, all wheel drive and four wheel drive vehicles. The plunging CV joints will allow for axial movement during operation without the use of slip splines. Constant velocity joints are generally greased lubricated for life and sealed by a boot. Thus, constant velocity joints are sealed in order to retain grease inside the joint while keeping contaminants and foreign matter, such as dirt and water, out of the joint. To achieve this protection, the constant velocity joint is usually enclosed at the open end of the outer race by a sealing boot made of a rubber, thermoplastic, or silicone material. The opposite end of the outer race is generally enclosed by a dome or cap, known as a grease cap in the case of a disk type joint. A monoblock or integral stem and race design style does not use a grease cap. Instead it is sealed by the internal geometry of the outer race. This sealing and protection of the constant velocity joint is necessary because contamination of the inner chamber may cause internal damage of the joint. Furthermore, once the inner chamber of the constant velocity joint is lubricated, it is lubricated for life.

During operation, the constant velocity joint creates internal pressures in the inner chamber of the joint. These pressures have to be vented to the outer atmosphere in order to prevent pressure build-up which occurs during operation of the joint and may destroy the boot. If the pressure build-up is allowed to reach a critical state, the boot may crack and have a blow out thus losing sealability. Generally speaking a constant velocity joint is usually vented by placing a small hole generally in the center of the grease cap or at least one hole around the outer periphery of the outer race. These prior methods of venting the gas have some limitations because if the constant velocity joint is in a static state and not rotating, the lubricating grease may settle on the vent hole and block or hinder its function of venting any internal gas pressure. This type of vent may also allow the infiltration of contaminants into the internal chamber of the constant velocity joint. Furthermore, the constant velocity joint, after running for long periods of time, creates very high temperatures along with high pressures which are vented through the prior art vent holes. However, if the constant velocity joint is submerged or saturated in water or other contaminants, the water will, via a pressure differential, be sucked into the constant velocity joint thus contaminating the grease lubricant and possibly reducing the life of the constant velocity joint.

Therefore, there is a need in the art for a constant velocity joint that prevents the buildup of internal gas pressure while eliminating the ingress of contaminants from entering the constant velocity joint.

BRIEF SUMMARY OF THE INVENTION

One object of the present invention is to provide a new venting solution for a constant velocity joint.

Yet a further object of the present invention is to provide a vent for a constant velocity joint that is capable of releasing gas under pressure to the atmosphere.

Yet a further object of the present invention is to provide a vent that prevents the entry of contaminants into the constant velocity joint.

Still a further object of the present invention is to provide a constant velocity joint that vents and allow equalization of pressure internally from the constant velocity joint relative to the atmosphere.

To achieve the foregoing objects, a vent for a constant velocity joint is disclosed. The constant velocity joint vent includes circumferential base and a cylindrical projection extending from an end of the base. The constant velocity joint vent further includes a circumferential flange extending from a surface of the projection. The constant velocity joint vent also includes a valve arranged on an end of the cylindrical projection opposite from the base. The valve is arranged such that it is made of a pliable material and is capable of allowing pressure to be released through the valve but to prevent the ingress of contaminants into the valve and constant velocity joint.

One advantage of the present invention is that the constant velocity joint includes a vent that allows for equalization of pressure from inside the constant velocity joint to the atmosphere.

A further advantage of the present invention is that the constant velocity joint stops the entry of contaminants into the constant velocity joint internal chambers.

A further advantage of the present invention is that the vent is resistant to grease, heat and is pliable thus allowing for the venting and closing off of the outside atmosphere to the internal workings of the constant velocity joint.

Still another advantage of the present invention is that the constant velocity joint vent is operable at high speeds and high temperatures sometimes found in prop shafts of automotive vehicles.

Other objects, features and advantages of the present invention will become apparent from the subsequent description and appended claims, taken in conjunction with the accompanying drawings.

BRIEF DESCRIPTION OF THE DRAWINGS

FIG. 4 shows a partial cross section of a constant velocity joint vent according to the present invention.

FIG. 5 shows a partial cross section of an alternate embodiment of the constant velocity joint vent according to the present invention.

FIG. 6 shows an isometric view of the vent according to the present invention.

FIG. 7 shows a side view of the vent according to the present invention.

FIG. 8 shows a cross section of the vent according to the present invention taken along line 8—8 of FIG. 7.

BEST MODE FOR CARRYING OUT THE INVENTION

Figure 1:
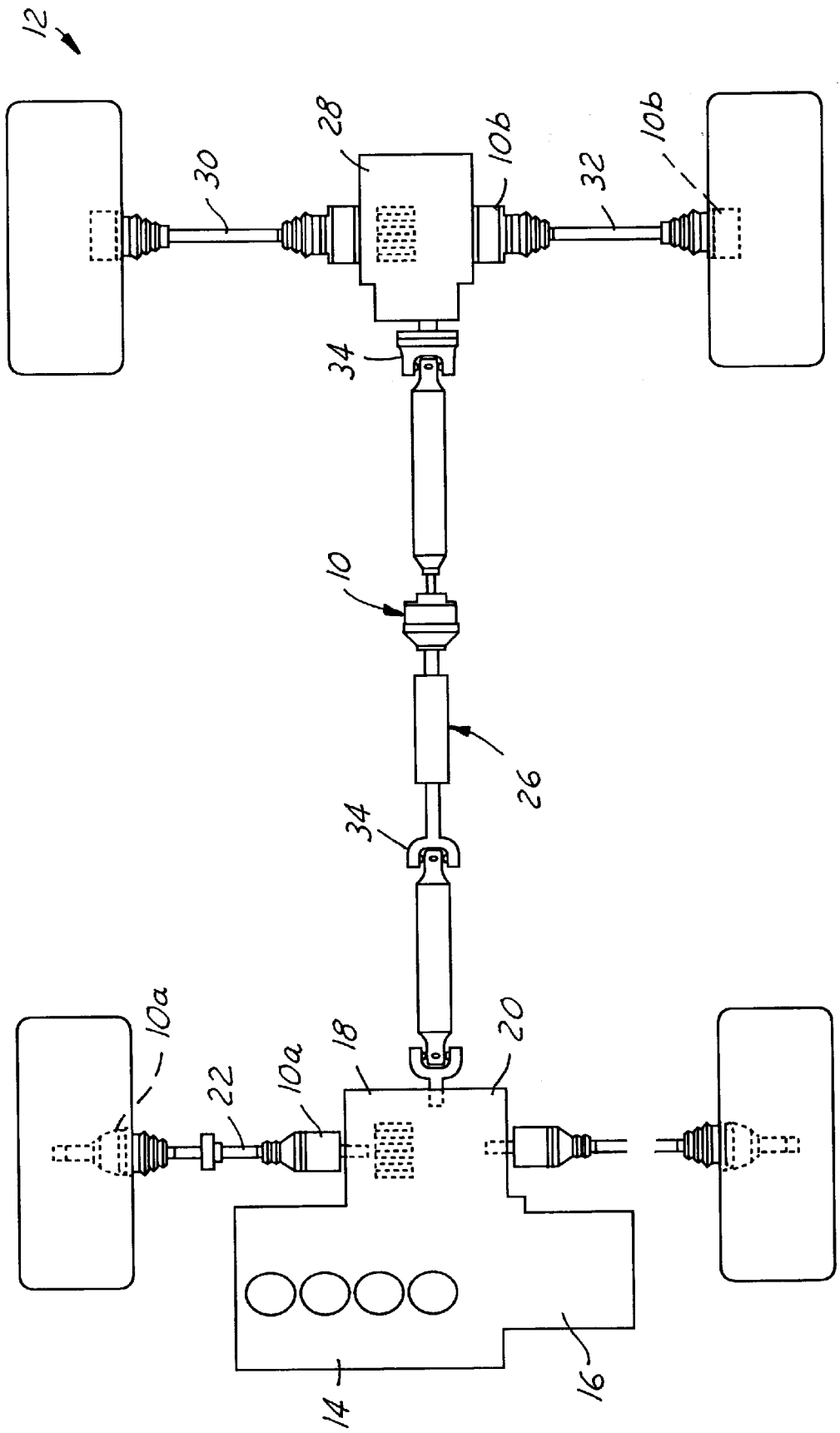
FIG. 1 shows a plan view for a vehicle drive line.

Referring to the drawings, a constant velocity joint 10 according to the present invention is shown. It should be noted that any type of constant velocity joint 10, such as a plunging tripod, fixed tripod, etc., may be used according to the present invention. The present invention includes a novel and improved method of venting the constant velocity joint 10.

FIG. 1 shows a typical drive line of an automotive vehicle 12. The drive line shown in FIG. 1 can be a typical all wheel drive vehicle, however it should be noted that the constant velocity joint 10 of the current invention can also be used in rear wheel drive vehicles, front wheel drive vehicles, all wheel drive and four wheel drive vehicles. The drive line includes an engine 14 that is connected to a transmission 16 and a power take off unit 18. The front differential 20 has a right hand side half shaft 22 and a left hand side shaft 24, each of which are connected to a wheel and deliver power to the wheels. On both ends of the right hand front half shaft 22 and the left hand front half shaft 24 are constant velocity joints 10a. A propeller shaft 26 connects the front differential 20 to the rear differential 28, wherein the rear differential 28 includes a rear right hand side shaft 30 and a rear left hand side shaft 32, each of which ends with a wheel on one end thereof. A constant velocity joint 10b is located on both ends of the half shaft that connect to the wheel and the rear differential 28. The propeller shaft 26, as shown in FIG. 1, is a three piece propeller shaft 26 that includes a plurality of Cardan joints 34 and one high speed constant velocity joint 10. The constant velocity joints 10a or 10b may be of any of the standard types known, such as plunging tripod, a cross groove joint, a fixed joint, a fixed tripod joint, or double offset joint, all of which are commonly known terms in the art for different varieties of constant velocity joints. Constant velocity joints allow for transmission of constant velocities at angles which are found in every day driving of automotive vehicles on both the half shafts and prop shafts of these vehicles.

Figure 2:
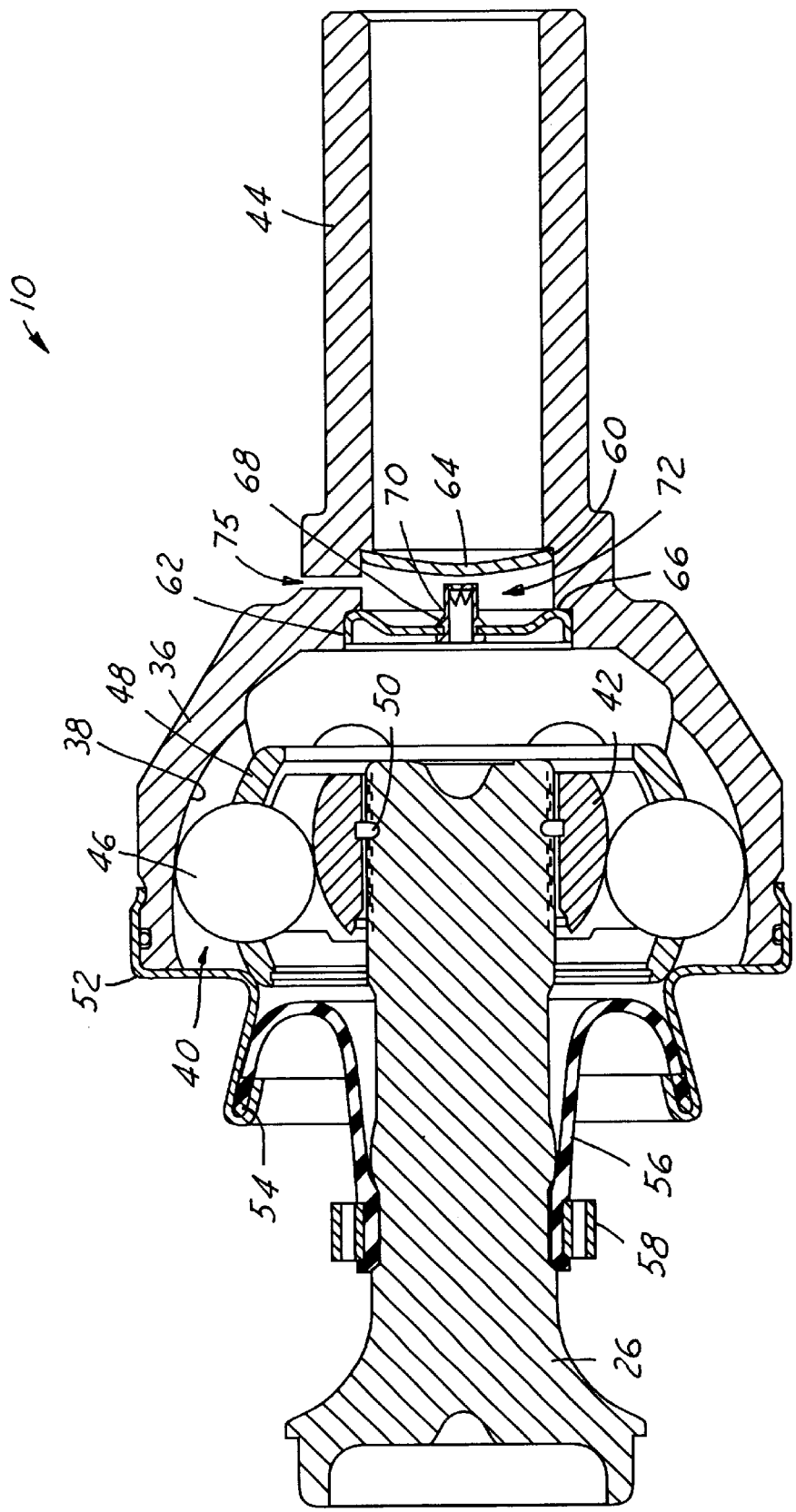
FIG. 2 shows a cross section of a constant velocity joint according to the present invention.

FIGS. 2, 4, and 6–8 show a preferred embodiment of the present invention. The constant velocity joint 10 is a fixed constant velocity joint of the monoblock style and is generally used in the prop shaft 20 in an all wheel drive vehicle. It should be noted that any other type of constant velocity joint may also be used for the present invention. The constant velocity joint 10 as shown in FIG. 2 includes an outer race 36 which has a shaft 44 attached to one end thereof. An inner wall 38 of the outer race 36 generally defines a constant velocity joint chamber 40. An inner race 42 is located or housed within the outer race 36. The inner race 42 is connected to the drive shaft or prop shaft 26 of the vehicle. A ball or rolling element 46 is located between an outer surface of the inner race 42 and the inner wall 38 of the outer race 36. The ball 46 is held in position between the outer race 36 and inner race 42 surfaces by a cage 48. The rotation of the outer race 36 will rotate the inner race 42 at the same or constant speed thus allowing for constant velocity to flow through the joint between the prop shaft 26 and the power take off unit 18 that is angled up to a predetermined fixed angle. The constant velocity joint 10 will allow the angle to change because the balls 46 will be able to rotate and compensate for any difference in the angle between the shafts by moving within the outer race 36 and inner race 42 indentations.

A snap ring retainer 50 is located on an inside surface of the inner race 42 to allow for a connection of the prop shaft 26 to the inner race 42. A boot cover 52 is connected to the outer surface of the outer race 36. One end of the boot cover 52 has a channel 54 that extends along the entire periphery of the boot cover 52. One end of a boot member 56, which in the preferred embodiment, is made of a urethane or other rubber material. However it should be noted that any other type of hard plastic or soft rubber like material may also be used. The boot 56 is secured within the channel 54 of the boot cover 52 while the other end engages the drive shaft 26 and is held in place by a boot clamp 58. The boot 56 seals the constant velocity joint 10 from any outside contaminants, such as water, dirt and road grime. The design of the urethane boot 56 allows for a seal interface through any angle of inclination that the drive shaft or half shafts may encounter during normal driving operations.

An interior surface of the outer race 36 includes a first shoulder portion 60 and a second shoulder portion 62. The first shoulder portion 60 includes a first plug or cover 64 which is generally made of a metal material and seals the outer race 36 and chamber 40 from transmission oils or contaminants of the transmission. In contact with the second shoulder 62 of the outer race is a second plug or cover 66 which in the preferred embodiment is made of metal, but may be made of any other type of ceramic or hard plastic or other metal composite material depending on the needs and design requirements of the constant velocity joint 10. The second plug 66 includes an orifice 68 at a center thereof which will allow for securing of the vent 70 in the constant velocity joint 10. The first plug 64 and second plug 66 form a second chamber 72 adjacent to the first chamber 40 formed by the outer race 36 of the constant velocity joint 10. A second orifice 75 is located through the outer race to vent the second chamber 72 to the atmosphere or outside air. This allows the gas to pass through the second plug 66 to be vented to the atmosphere through the second orifice 75 which is located through the outer race surface. Located within the orifice of the second plug 66 and adjacent to the first plug 64 within the second chamber 72 is a vent 70 according to the present invention.

Figure 3:
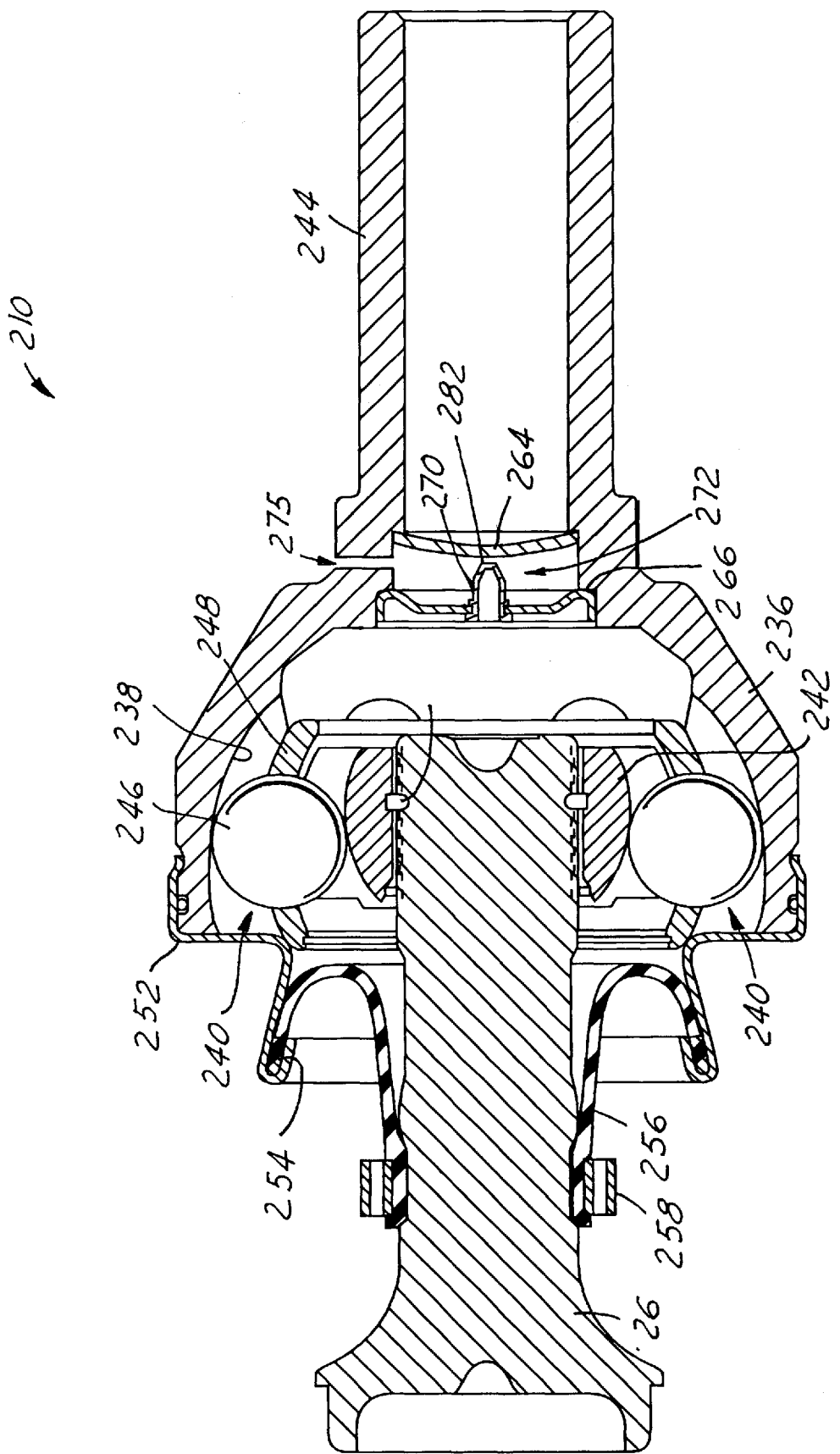
FIG. 3 shows a cross section of an alternate embodiment of a constant velocity joint according to the present invention.

The vent 70 in the preferred embodiment is made of a pliable material such as high durometer silicone, neoprene material or even TPE, however it should be noted that any other pliable material may be used to design the vent. The vent 70 generally has a circumferential base 74 with a cylindrical projection 76 extending from an end of the base 74. A circumferential flange 78 is located adjacent to the base 74. One side of the flange 78 defines a ring like notch 80 around the outer periphery of the vent 70. This ring like notch 80 is used to engage with the orifice 68 through the second plug 66, thus providing the securing method of the vent 70 to the second plug 66 and ensuring that the vent 70 stays in place through all environmental changes within the constant velocity joint 10. The vent 70 is placed within the second plug 66 such that the cylindrical projection 76 extends within the second chamber 72. The circumferential flange 78 generally has a triangular cross section, however it should be noted that in the alternate embodiment as shown in FIGS. 3 and 5 the cross section may be more rectangular or square in shape for the circumferential flange which is adjacent to the base 74. The cylindrical projection 76 and the base 74 define a chamber 71 of the vent 70 communicating between the first chamber 40 and the second chamber 72.

A valve 82 is arranged on the end of the cylindrical projection 76 that extends into the second chamber 72. The valve 82 mentioned above is pliable such that it will allow the exit of gasses under pressure to the atmosphere while blocking the entry of any contaminants or water into the first chamber 40 of the constant velocity joint 10. The valve 82 generally includes a bill or flattened 82a section. The bill 82a section operated by opening at least one slit 84 and allowing the pressurized air from inside the constant velocity joint 10 to vent and then when the pressure is equalized closings its slits 84 or bill and preventing the ingress of contaminants into the constant velocity joint inner chamber 40. The bill 82a section generally includes a plurality of notches 86 around the outer periphery. In the preferred embodiment there are found notches 86 carved into the valve section 82. The notches 86 are generally triangular shaped or quadrant shaped that reduces in size as the notch 86 nears the circumferential flange 78 of the vent 70. The notches 86 then define a cross shaped surface 88 for the end of the valve 82. The cross shaped surface 88 includes a first slit 84 and a second slit 90 that intersect one another through the surfaces of the cross shaped section 88. The slits 84, 90 open when pressurized air comes out, i.e., like the mouth of a bill opening, and close once the pressure is equalized with the outer atmosphere, thus preventing any ingress of water or contaminants into the inner chamber 40. The prior art has shown that contaminants generally are sucked into the inner chamber of the constant velocity 10 joint when the constant velocity joint 10 Is submerged or soaked in water or any other contaminate thus creating a back pressure which would serve to close the slits 84, 90 of the bill 82a section of the vale thus preventing any contaminants from entering the internal chamber 40 of the constant velocity joint 10. The use of a pliable material for the constant velocity joint vent 70 will allow for the complete closure of the vent slit 84, 90 thus blocking the entry of contaminants into the internal chamber 40 while also allowing for easy opening of the slits 84, 90 to allow for exiting high pressure gas to the atmosphere.

As shown in FIGS. 3 and 5 an alternate embodiment of the present invention is shown, it should be noted that like elements are represented by like numerals. The constant velocity joint 210 includes a vent 270 with a base 274 having a cylindrical projection 276 extending therefrom while also including a circumferential flange 278 extending from a surface of the projection adjacent to the base 274. The vent 270 only differs from the preferred embodiment in that the valve section 282 has arranged at one end of the alternate embodiment vent 270 a cone shaped end 270a. This cone shaped end 270a includes at least one slit 284 but preferably crossed slits 284, 290 on the end thereof thus allowing for the outlet of pressurized gas to the atmosphere and preventing the ingress of contaminants into the internal chamber 240 of the constant velocity joint 210.

In operation the constant velocity joint 10 is filled with a lubricant to reduce the internal temperature and lubricate the moping parts within the constant velocity joint 10. In the preferred embodiment the lubricant is a grease which is placed within an inner chamber 40 of the constant velocity joint and is sealed thereafter via the boot cover 52 and boot 56. When the constant velocity joint 10 is spinning at high speeds, the boot 56 may rupture prematurely because there is no venting of the internal pressure of the joint which results in failures of the boot 56 and the constant velocity joint 10. Currently constant velocity joints tend to use a venting hole in the center of an end cap or through the side of the outer race for equalizing joint pressure but this solution is sometimes insufficient in obstructing water and contaminants from entering the joint and also is occasionally plugged by the lubricant within the joint. Therefore, at high pressures and temperatures within the constant velocity joint 10 the vent 70 mechanism must be able to equalize internal and external pressure differences while stopping the ingress of contaminants firm entering the constant velocity joint 10. Furthermore, the vent 70 must be resistant to grease and heat while also being pliable enough to allow for the release of the internal pressures. In the preferred embodiment the vent 70 for the current invention is located at the center of the joint 10 retained within the second plug 66 of the constant velocity joint wherein in a separate embodiment of the vent may be secured within the grease cap for a disk style type of joint. The current vent 70 uses the bill section 82a which will allow air to flow freely from the internal chamber to the outer chamber thus equalizing pressure inside the joint to that of the atmosphere. However, the same bill section will repel any water or contaminants that try to enter the constant velocity joint from the external environment by compressing the slits 84, 90 at the valve section. The vent 70 according to the present invention may also be designed to any specified functional pressure range depending on the internal pressures that are needed to deform the boot during operation of the high speed constant velocity joint. Thus, the vent according to the present invention needs to be altered to fit the specific type of environment the constant velocity joint 10 will be used in. By preventing any water or grime from entering the constant velocity joint chamber 40 the vent 70 will reduce any contamination of the grease. The grease may break down when mixed with water or dirts thus reducing its lubricating properties and increasing the internal temperatures and pressures.

What is claimed is:

1. A constant velocity joint for use in a vehicle drive train, said constant velocity joint comprising:

an outer race, said outer race defining a part of a chamber for the constant velocity joint;

an inner race;

a rolling element disposed between said inner race and said outer race;

a cage in contact with said rolling element;

a boot cover connected to one end of said outer race;

a shaft engaging said inner race;

a boot in contact with said boot cover on one end thereof and in contact with said shaft on a second end thereof;

a plug located at one end of said chamber, said plug having an opening therein;

a vent comprising a circumferential base, a cylindrical projection extending from said base, a flange extending from a surface of said cylindrical projection, and a valve arranged on an end of said cylindrical projection opposite the circumferential base, wherein said circumferential base and said flange are adapted to engage said plug opening and wherein said valve includes a flattened bill section.

2. The constant velocity joint of claim 1 wherein said base and said flange define a channel, said channel interacts with said plug to secure said vent to said plug.

3. The constant velocity joint of claim 1 wherein said valve includes a release section.

4. The constant velocity joint of claim 3 wherein said release section having a plurality of notches, said notches define a cross shape surface on an end of said valve.

5. The constant velocity joint of claim 4 wherein said cross shape surface having at least one slit there through, said slit opens to release pressure from said chamber of the constant velocity joint.

6. The constant velocity joint of claim 1 wherein said valve having a generally cone shape, said cone shape having a slit at an end thereof.

7. The constant velocity joint of claim 1 wherein said vent is made of a pliable material.

8. The constant velocity joint of claim 1 wherein said vent will release pressure to an atmosphere and repel contaminants from entering said chamber.

9. A constant velocity joint for use in a vehicle, said constant velocity joint comprising:

an internal chamber;

a plug on one end thereof said plug having an opening therein;

a boot on one end opposite of said plug; and a pliable vent engaging said plug opening, said vent having a circumferential base and a cylindrical projection extending from said base, said vent having a circumferential flange adjacent to said base, defining a channel for engaging said plug between said base and said flange, said vent having a one-way, flattened bill valve on an end thereof, said valve having at least one slit there through, said slit releases the pressure from said internal chamber of the constant velocity joint to the atmosphere and repels contaminants from entering the internal chamber when said slit is in a closed position, said bill valve defined by a plurality of notches and a cross shape surface.

* * * * *

UNITED STATES PATENT AND TRADEMARK OFFICE
CERTIFICATE OF CORRECTION

| | | |
|---|---|---|
| PATENT NO. | : 6,540,616 B2 | Page 1 of 1 |
| APPLICATION NO. | : 09/833842 | |
| DATED | : April 1, 2003 | |
| INVENTOR(S) | : Michael J. Miller and John A. Ramey | |

It is certified that error appears in the above-identified patent and that said Letters Patent is hereby corrected as shown below:

At Column 5, Line 54: Replace "moping" with --moving--

Signed and Sealed this

Nineteenth Day of December, 2006

JON W. DUDAS
*Director of the United States Patent and Trademark Office*